(12) United States Patent
Aokage et al.

(10) Patent No.: US 11,284,010 B2
(45) Date of Patent: Mar. 22, 2022

(54) APPARATUS AND METHOD FOR EXPOSURE ESTIMATION

(71) Applicant: Canon U.S.A., Inc., Melville, NY (US)

(72) Inventors: Hironori Aokage, Plainview, NY (US); Haruki Sekiyama, Port Washington, NY (US)

(73) Assignees: Canon U.S.A., Inc., Melville, NY (US); Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/076,236

(22) Filed: Oct. 21, 2020

(65) Prior Publication Data

US 2021/0120164 A1    Apr. 22, 2021

Related U.S. Application Data

(60) Provisional application No. 62/924,448, filed on Oct. 22, 2019.

(51) Int. Cl.
*H04N 5/235*    (2006.01)

(52) U.S. Cl.
CPC ......... *H04N 5/2351* (2013.01); *H04N 5/2353* (2013.01); *H04N 5/2355* (2013.01)

(58) Field of Classification Search
CPC .. H04N 5/2351; H04N 5/2355; H04N 5/2353; H04N 5/23225; G06T 5/00
See application file for complete search history.

(56) References Cited

U.S. PATENT DOCUMENTS

2006/0256396 A1* 11/2006 Ejima ................ H04N 5/23222
358/448

* cited by examiner

*Primary Examiner* — Twyler L Haskins
*Assistant Examiner* — Angel L Garces-Rivera
(74) *Attorney, Agent, or Firm* — Canon U.S.A., Inc., IP Division

(57) ABSTRACT

An apparatus for evaluating an image is provided and includes one or more processors, and one or more memories storing instructions that, when executed by the one or more processors configure the apparatus to perform operations including receiving an input image, determining whether an exposure value corresponding to an input image is to be evaluated based on information obtained by the input image, and evaluating the exposure value corresponding to the input image according to the determined result.

13 Claims, 5 Drawing Sheets

Do not display the image C

APPARATUS AND METHOD FOR EXPOSURE ESTIMATION

CROSS-REFERENCE TO RELATED APPLICATIONS

This is a nonprovisional patent application that claims the benefit of U.S. Provisional Patent Application Ser. No. 62/924,448 filed on Oct. 22, 2019, the entirety of which is incorporated herein by reference.

BACKGROUND

Field

The present disclosure relates to image processing and, more specifically, to estimating an exposure level of an image.

Description of Related Art

Known techniques exist for estimating an exposure level based on image brightness. Typically, images having a low brightness level are deemed of lesser quality because of the overall darkness of the pixels in the image. This leads to a problem whereby images that are intended to be in dark conditions such as night images or low-light indoor images are misclassified as having a lower quality simply because of the level of darkness (e.g. lack of brightness) in the image. A system according to the present disclosure remedies these drawbacks by providing a way to properly classify and quantify image quality based on conditions under which the image was captured.

SUMMARY

According to an embodiment of the present disclosure, an apparatus for evaluating an image is provided and includes one or more processors, and one or more memories storing instructions that, when executed by the one or more processors configure the apparatus to perform operations including receiving an input image, determining whether an exposure value corresponding to an input image is to be evaluated based on information obtained by the input image, and evaluating the exposure value corresponding to the input image according to the determined result.

According to another embodiment, in a case where the input image includes night scene image, it is determined that the exposure value corresponding to the input image is not to be evaluated. In an exemplary embodiment, the night scene image is an image whose brightness corresponds to a predetermined exposure value and which includes one or more predetermined items within the image. The one or more predetermined items within the image include one or more of firework, light from a building, fire, star, and moon.

According to another embodiment, the image evaluating apparatus according to claim 1, further comprises a display for displaying an image, and execution of the instructions further configure the apparatus to perform operations including outputting evaluation information and the input image on the display together, the evaluation information being related to the exposure value corresponding to the evaluated input image. In a further embodiment, in a case where it is determined that the exposure value corresponding to the input image is not to be evaluated, the predetermined information and the input image are output on the display together, the predetermined information being different from the evaluation information and indicating that the exposure value corresponding to the input image is not to be evaluated. In another embodiment, in a case where it is determined that the exposure value corresponding to the input image is not to be evaluated, the input image is not output on the display.

According to another embodiment of the present disclosure, an image evaluating apparatus is provided and includes one or more processors, and one or more memories storing instructions that, when executed by the one or more processors configure the apparatus to perform operations including receiving an image, determining a method to evaluate an exposure value corresponding to an input image input by the input unit based on information obtained by the input image, and evaluating the exposure value corresponding to the image based on the determined method.

According to a further embodiment of the present disclosure, an image evaluating apparatus is provided and includes a display for displaying an image; one or more processors, and one or more memories storing instructions that, when executed by the one or more processors configure the apparatus to perform operations including receiving an input image, and switching whether to display evaluation information, which is related to an exposure value corresponding to an input image, on the display or not based on information obtained by the input image.

These and other objects, features, and advantages of the present disclosure will become apparent upon reading the following detailed description of exemplary embodiments of the present disclosure, when taken in conjunction with the appended drawings, and provided claims.

Figure 1:
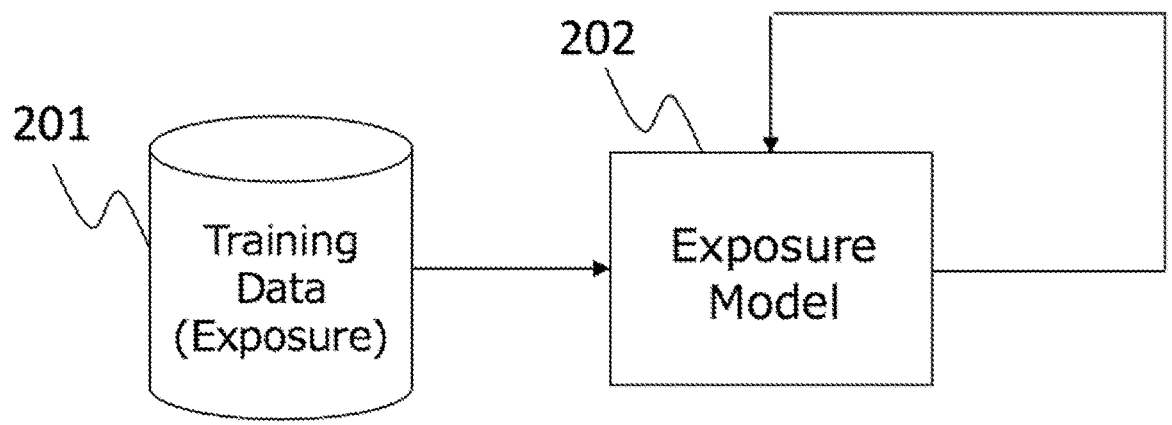
FIG. 1 is a block diagram detailing a training method for a machine learning model.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

According to the present disclosure, an apparatus and method are provided for improving exposure estimation especially when there image being analyzed is captured according to a predetermined capture type. is a night scene or has a predetermined level of light. Incorrect explosion estimation results when the image input for estimation is of a night scene image or dark images shot in a dark condition. In many cases, these images tend to be estimated as lower exposure because of lower value of pixels in image. Because of this, the image quality may be judged as less than optimal because of the lower overall pixel values in the image. However, if the image is captured under certain conditions such as in a dark environment or using a particular image capture setting such as "night mode", the mere quantitative judgement of pixel values may not produce the most accurate judgement about the image quality. More specifically, if the image is captured as intended by the user under dark conditions or as a nighttime image or using a scene mode such as night scene they are estimated as lower exposure, they should still be treated as optimal images as a "good image" point of view. That is, the night scene image is usually dark. Therefore, when it is compared with other images which are not the night scene image, the night scene image tends to be treated "too dark" from the point of view of an exposure determination. However, the night scene image looks "optimal" in point of exposure when considering a situation where the image was shot, such as a time or a place.

The disclosure below illustrates a method and apparatus for improving exposure estimation to properly classify images that are input for analysis. For purposes of this disclosure, "Exposure" means the amount of light which reaches a camera sensor or film (image capture device setting) and "Brightness" means brightness of a captured image (image feature). An exemplary algorithm for estimating exposure according to the present disclosure is described in FIG. 3. The algorithm described therein makes use of a trained machine learning model which has been trained with a set of training data to generate an exposure model for images captured according to a particular image capture setting such as "night scene detection". This training is discussed with respect to FIGS. 1 and 2.

FIG. 1 illustrates the block diagram for an exposure model training. Block 201 is a training data set for exposure model. The data in training set consists of training images and corrected data corresponding to each image. Training images are shot by a camera while changing the exposure value {−3, −2, −1, 0, 1, 2, 3} under a particular image capture setting such as in a particular scene mode able to be selected on the image capture device. Then these exposure value which is corresponding to its image is the correct data in the training set. Here, even though input images are JPEG images in this example, there are no limitation to use any kind of image format. In certain embodiments, the image data is RAW image data. Block 202 is the exposure model. In this example, a Neural Network is used to create the exposure model here, but it is not limited to use Neural Network in general. Training process is performed to utilize training set in this block, then after training, trained exposure model can be obtained. The exposure model is used for evaluating the exposure value corresponding to a new input image.

Figure 2:
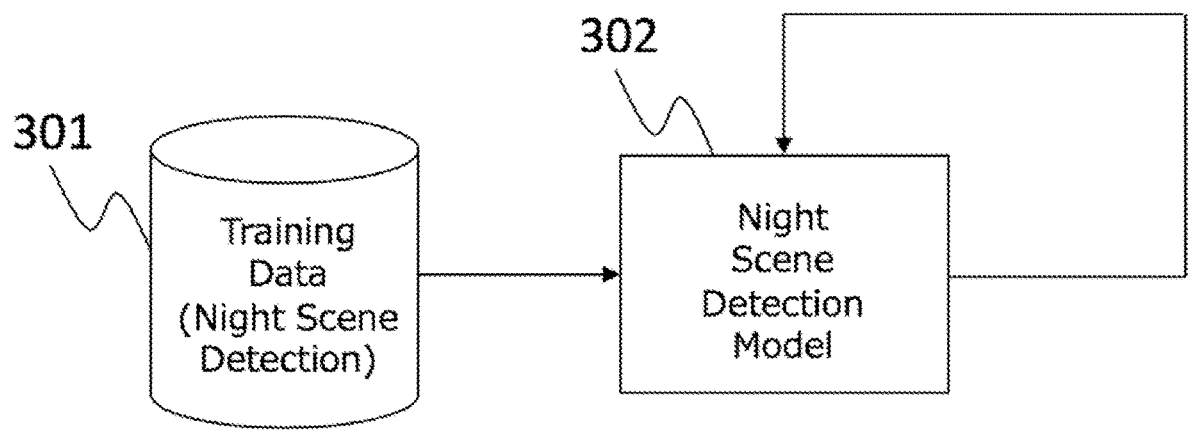
FIG. 2 is a block diagram detailing a training method for a machine learning model.

FIG. 2 illustrates the block diagram for training a model that will determine whether an image has been captured according to a predetermined image capture mode. As used as an example, the predetermined image capture mode is "night scene mode" and this the trained model will be a night scene detection model. Block 301 is a training data set for night scene detection model. The data in the training set consists of training images and corrected data corresponding to each image. Here, training images are shot as night scene and non-night scene. Then each of the training images have labels as "night scene" or "non-night scene" as corrected data for each image. Here, even though input images are JPEG images in this example, there are no limitation to use any kind of image format such as RAW. Block 302 is the night scene detection model. A Neural Network is used to create the night scene detection model here, but it is not limited to use Neural Network in general. The training process is performed to utilize training set in this block, then after training, trained exposure model can be obtained. The night scene detection model is used for determining whether a new input image is the night scene image or not.

Figure 3:
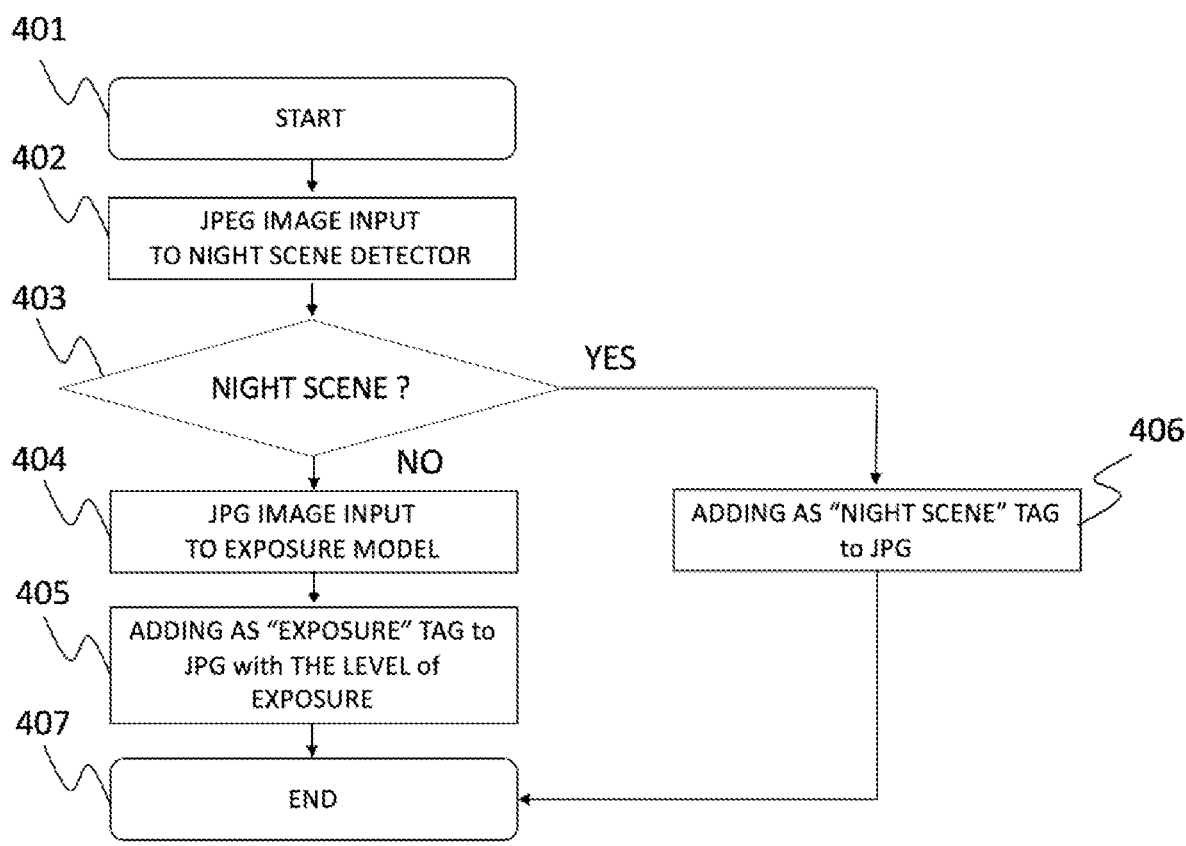
FIG. 3 is a flow diagram detailing an algorithm for implementing the present disclosure.

FIG. 3 illustrates a flow chart of detailing the exposure estimation processing according to the present disclosure. In this embodiment, the exposure estimatation is performed to detect if an input image is was captured according to a particular image capture mode such as "night scene mode". While the exemplary operation is described with respect to night scene detection any number of models used to detection an image captured according to other image capture modes may be trained using image characteristics and image capture settings associated with the other image capture modes. The flow chart starts at Step 401. In Step 402, an image is input to the night scene detection model. Here, even though input images are JPEG images in this example, there are no limitation to use any kind of image format. In Step 403, night scene detection is initially performed. If it is determined that the image is a night scene, processing continues at Step 406. On the other hand, if the image is detected as non-night scene, processing is continued at Step 404.

Turning first to the result of detection processing indicating that the input image is not a night scene. In Step 404, if the input image is detected as non-night scene, the image is input to the exposure model. The exposure model estimates the exposure value based on the input image. In Step 405, the exposure value obtained in Step 404 is added to the image as a tag.

Turning now to the processing resulting from the detection processing indicating that the input image is a night scene. In Step 406, if the images are detected as night scene in Step 403, night scene tag is added to the image and processing continues at step 407 where processing concludes with images being tagged according to their detection.

Figure 4:
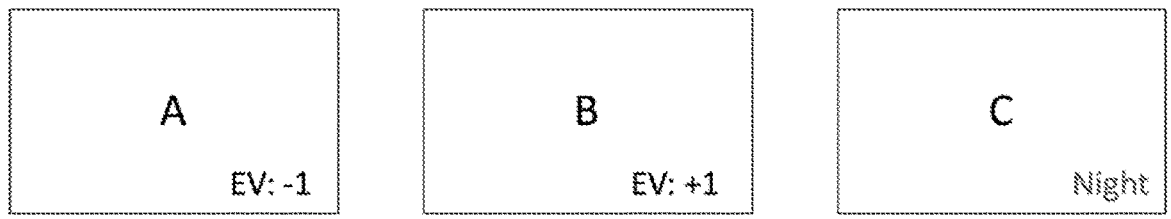
FIG. 4 illustrates an exemplary user interface displaying images evaluated by the algorithm of FIG. 3.
Figure 5:
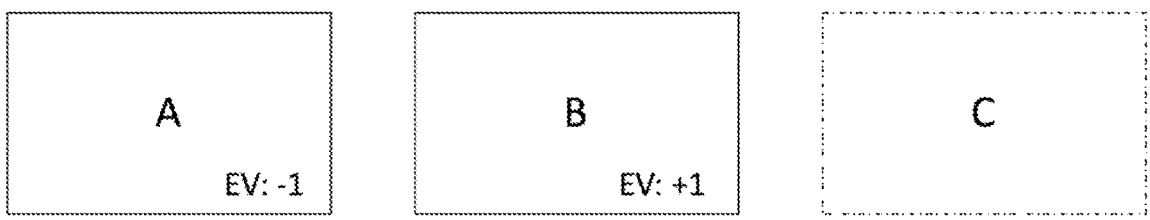
FIG. 5 illustrates an exemplary user interface displaying images evaluated by the algorithm of FIG. 3.

After the processing in the flow chart illustrated in FIG. 3, the input images are displayed. The method of displaying the images are illustrated below. FIG. 4 illustrates an example of how to display the images. An image A and an image B are detected as non-night scene and the exposure values corresponding to the image A and the image B are estimated by the flow chart illustrated in FIG. 3. So, as illustrated in FIG. 4, the exposure values are displayed on the corresponding images. On the other hand, because an image C is detected as night scene, the word "Night" is displayed on the image. FIG. 5 illustrates another example of how to display images. Image A and Image B are displayed in the same way as illustrated in FIG. 4. On the other hand, Image C is not displayed because the image is detected as night scene. As such, display processing is performed so as to omit or actively prohibit Image C from being displayed.

As described herein, images evaluated to be night scene images include images determined to have one or more image characteristics which include, but is not limited to, an image capture setting and predetermined image content contained within the captured image. In one embodiment, the image capture setting includes an EV value within the range of EV −2 and EV −3. In other words, the image can be determined to have an average brightness may be considered shot according to the predetermined image capture mode corresponding to "night scene". In one embodiment, the image is also analyzed to determine if it contains predetermined image content. This includes, but is not limited to, a street light (lit or unlit), fireworks, light from another object (e.g. building, vehicle, individual holding a light emitting device, etc.), fire, stars, and a moon etc. This is merely exemplary image content and other type of content that are related to night time scenes can be derived during the training process when images are tagged and analyzed so that it may be part of the trained model used to evaluate images.

It should also be noted that it is not necessary that entire area of the input image needs to be classified or determined to be a night scene image. The estimation processing as described herein can be applied to the image having a group of pixels determined to comport with the above listed characteristics and as such, includes a partial night scene. The estimation processing can further be applied to dark scenes shot, on purpose, in a dark condition, such as concert scene or night party. In the example above, exposure value estimation is not performed for night scene image. However, the estimation processing may include a case where the exposure value estimation is performed for the night scene image but the night scene image is not output on the display.

According to another embodiment, an algorithm according to the present disclosure evaluates an image input thereto according to both an image capture setting and an image capture mode. In this example, the model evaluates images for exposure values and night scene capture. This is illustrated with the flow chart described in FIG. 7. However, execution of the algorithm in FIG. 7 relies upon the use of a machine learning model trained to evaluate an overall exposure in an image, an exposure value for night scene model and a night scene detection. FIG. 1 illustrates the block diagram for the exposure model training, the description of which is incorporated herein by reference. FIG. 2 illustrates the block diagram for the night scene detection model training, the description of which is incorporated herein by reference. The method of processing is also the same as Example 1.

Figure 6:
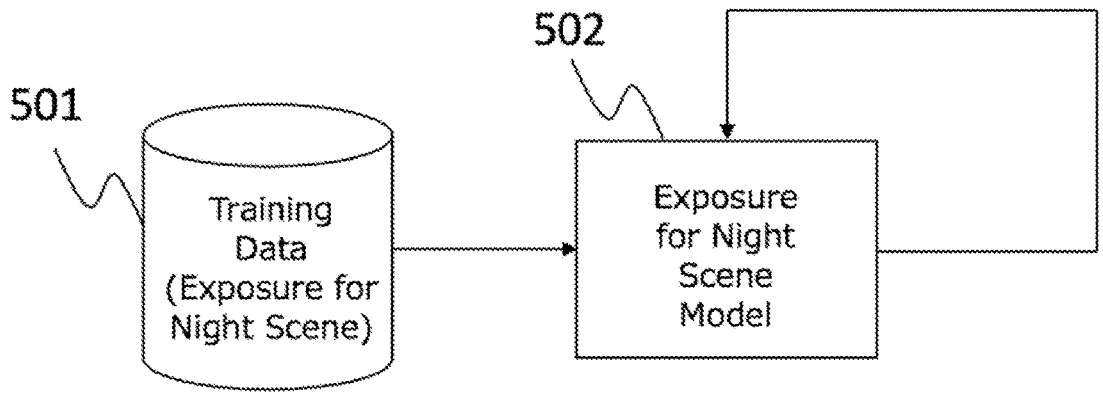
FIG. 6 is a block diagram detailing a training method for a machine learning model.

FIG. 6 illustrates the block diagram for training a machine learning model to evaluate an exposure value for night scene. Block 501 is a training data set for training the model to evaluate an exposure for night scenes. The data in the training set consists of training images and corrected data corresponding to each image. Training images are captured by an image capture device with images where the exposure value is change {−3, −2, −1, 0, 1, 2, 3} in a scene. Also, training data here is limited to images captured by the image capture device according to the predetermined image capture mode such as night scene. However, exposure value is adjusted 2 stops higher than actual exposure value of camera. So, the exposure value {−3, −2, −1, 0, 1, 2, 3} from the camera is adjusted as {−1, 0, 1, 2, 3, 4, 5} when the corrected data is created. That is, if one night scene image is captured with the exposure value {−2}, the exposure value is adjusted to {0} and the adjusted exposure value is used as the corrected data corresponding to this image. Here exposure value is adjusted to two stop higher, but there are no limitation to set the number of stops for adjustment. Then the adjusted exposure values which correspond to its image is the corrected data in the training set. In other embodiments, each image used as part of the training set may be adjusted to different exposure values so that a single image captured with a first exposure value can be adjusted to produce a first adjusted image with a first adjusted exposure value and a second adjusted image with a second adjusted exposure value where the first and second adjusted exposure values are different from one another. Here, even though input images are JPEG images in this example, there are no limitation to use any kind of image format. Block 502 is the exposure for night scene model. A Neural Network is used to create the exposure model here, but it is not limited to use Neural Network in general. Training process is performed to utilize training set in this block, then after training, trained exposure for night scene model can be obtained. The exposure for night scene model is used for evaluating the exposure value corresponding to the night scene image.

Figure 7:
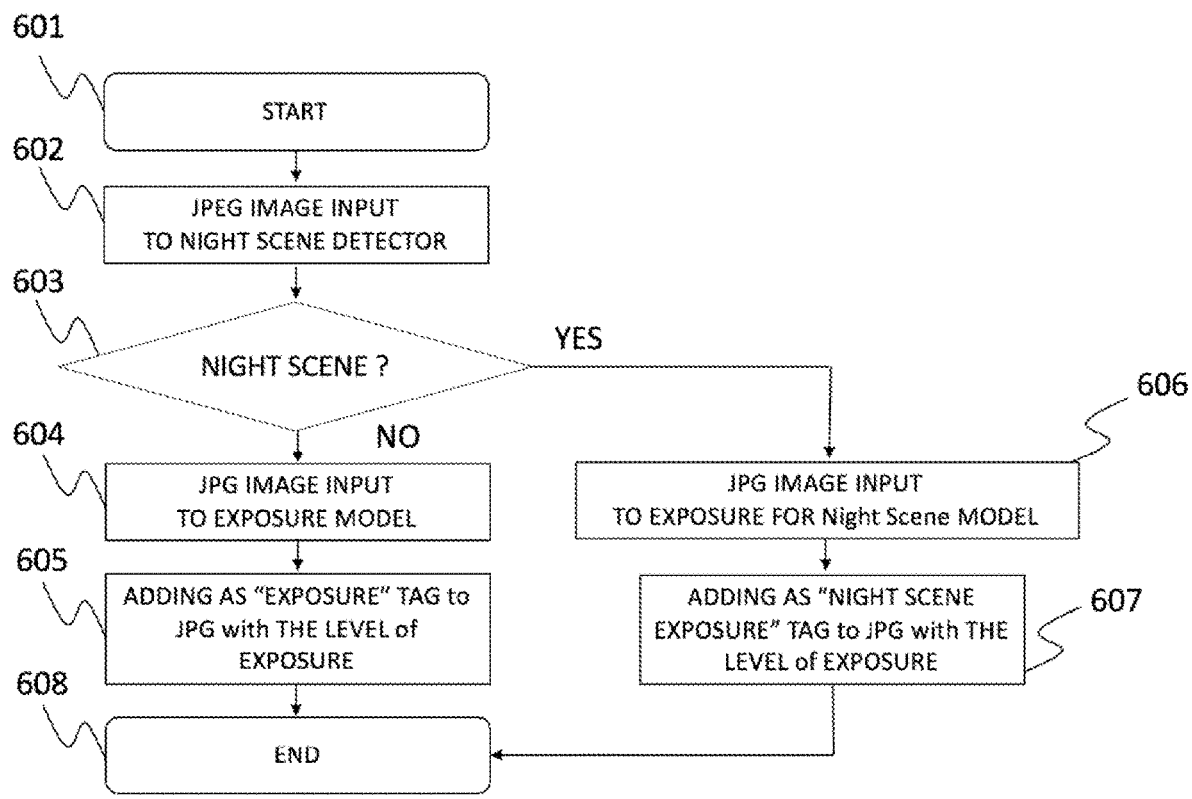
FIG. 7 is a flow diagram detailing an algorithm for implementing the present disclosure.

FIG. 7 illustrates a flow chart for using the trained model to process night scene exposure estimation. The flow chart starts at Step 601. In Step 602, an image is input to a night scene detection model. Here, even though input images are JPEG images in this example, there are no limitation to use any kind of image format.

In Step 603, night scene detection is initially performed. Then if the image is detected as night scene, process is forwarded to Step 606. On the other hand, if the image is detected as non-night scene, process is forwarded to Step 604. In Step 604, if the input image is detected as non-night scene, the image is input to the exposure model. The exposure model estimates the exposure value based on the input image.

In Step 605, the exposure value obtained in Step 604 is added to the image as a tag. In Step 606, if the images is detected as night scene in Step 603, the night scene image is input to the exposure for night scene model. The exposure for night scene model estimate the exposure value for night scene based on the input image. Then, in Step 607, night scene tag as well as estimated exposure value for night scene is added to the image. The flow chart ends in Step 608.

Figure 8:
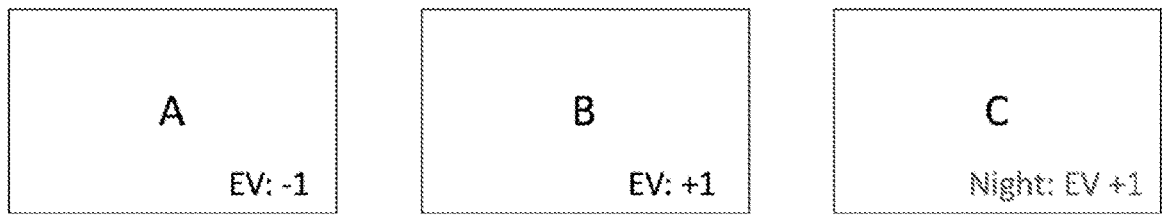
FIG. 8 illustrates an exemplary user interface displaying images evaluated by the algorithm of FIG. 7.

FIG. 8 illustrates an example of how to display images. An image A and an image B are detected as non-night scene and the exposure values corresponding to the image A and the image B are estimated by the flow chart illustrated in FIG. 7. So, as illustrated in FIG. 8, the exposure value are displayed on the corresponding images. On the other hand, because an image C is detected as night scene, the word "Night" as well as exposure value for night scene are displayed on the image.

Since GPUs can process data in parallel, it is effective to use GPUs when performing learning process multiple times using a learning model such as deep learning. Therefore, in this embodiment, GPU is used in the machine learning process in addition to the CPU. Specifically, when a learning program including a learning model is executed, learning is performed by the CPU and the GPU cooperating with each other. The machine learning process may be performed only by the CPU or GPU.

Figure 9:
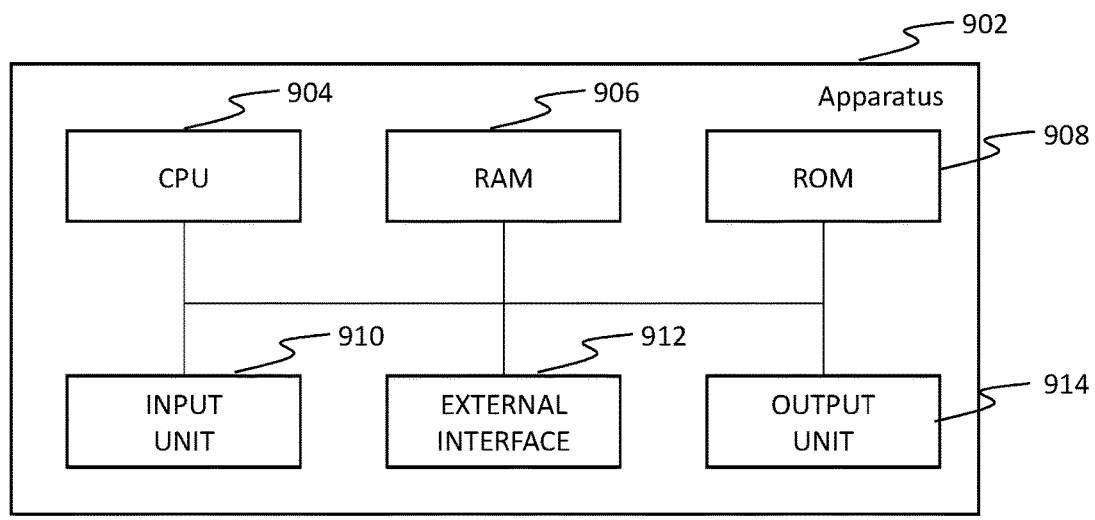
FIG. 9 is a block diagram of hardware for implementing the present disclosure.

FIG. 9 illustrates the hardware of an apparatus that can be used in implementing the above described disclosure. The apparatus 902 includes a CPU 904, a RAM 906, a ROM 908, an input unit 910, an external interface 912, and an output unit 914. The CPU 904 controls the apparatus 902 by using a computer program (one or more series of stored instructions executable by the CPU) and data stored in the RAM 906 or ROM 908. Here, the apparatus may include one or more dedicated hardware or a graphics processing unit (GPU), which is different from the CPU 904, and the GPU or the dedicated hardware may perform a part of the processes by the CPU 904. As an example of the dedicated hardware, there are an application specific integrated circuit (ASIC), a field-programmable gate array (FPGA), and a digital signal processor (DSP), and the like. The RAM 906 temporarily stores the computer program or data read from the ROM 908, data supplied from outside via the external interface 912, and the like. The ROM 908 stores the computer program and data which do not need to be modified and which can control the base operation of the apparatus. The input unit 910 is composed of, for example, a joystick, a jog dial, a touch panel, a keyboard, a mouse, or the like, and receives user's operation, and inputs various instructions to the CPU 904. The external interface 912 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 914 is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An image evaluating apparatus comprising:
   one or more processors, and
   one or more memories storing instructions that, when executed by the one or more processors configure the apparatus to perform operations including
   receiving an input image;
   determining whether an exposure value corresponding to an input image is to be evaluated based on information obtained by the input image, and
   evaluating the exposure value corresponding to the input image according to the determined result using an exposure evaluation model generated based on a plurality of training images which have different exposure values and exposure information corresponding to each of the training images.

2. The image evaluating apparatus according to claim 1, wherein,
   in a case where the input image includes night scene image, it is determined that the exposure value corresponding to the input image is not to be evaluated.

3. The image evaluating apparatus according to claim 2, wherein
   the night scene image is an image whose brightness corresponds to a predetermined exposure value and which includes at least one of firework, light from a building, fire, star, and moon.

4. The image evaluating apparatus according to claim 1, wherein execution of the instructions further configure the apparatus to perform operations including
   generating an exposure evaluation model by using a plurality of training images which have different exposure value and exposure information corresponding to each image.

5. The image evaluating apparatus according to claim 1, further comprising:
   a display for displaying an image,
   wherein execution of the instructions further configure the apparatus to perform operations including
   outputting evaluation information and the input image on the display together, the evaluation information being related to the exposure value corresponding to the evaluated input image.

6. The image evaluating apparatus according to claim 5, wherein,
   in a case where it is determined that the exposure value corresponding to the input image is not to be evaluated, the predetermined information and the input image are output on the display together, the predetermined information being different from the evaluation information and indicating that the exposure value corresponding to the input image is not to be evaluated.

7. The image evaluating apparatus according to claim 5, wherein,
in a case where it is determined that the exposure value corresponding to the input image is not to be evaluated, the input image is not output on the display.

8. An image evaluating apparatus comprising:
one or more processors, and
one or more memories storing instructions that, when executed by the one or more processors configure the apparatus to perform operations including
receiving an image;
determining a method to evaluate an exposure value corresponding to an input image input by the input unit based on information obtained by the input image, and
evaluating the exposure value corresponding to the image based on the determined method using an exposure evaluation model generated based on a plurality of training images which have different exposure values and exposure information corresponding to each of the training images.

9. An image evaluating method comprising:
inputting an image;
determining if an exposure value corresponding to an input image is to be evaluated based on information obtained by the input image, and
evaluating the exposure value corresponding to the input image according to a determination result using an exposure evaluation model generated based on a plurality of training images which have different exposure values and exposure information corresponding to each of the training images.

10. The image evaluating method according to claim 9, wherein
in a case where the input image includes night scene image, it is determined that the exposure value corresponding to the input image is not to be evaluated.

11. The image evaluating method according to claim 10, wherein
the night scene image is an image whose brightness corresponds to a predetermined exposure value and which includes at least one of fire work, light from a building, fire, star, and moon.

12. The image evaluating method according to claim 9, further comprising:
outputting, on a display, evaluation information and the input image together, the evaluation information being related to the exposure value corresponding to the evaluated input image.

13. A non-transitory computer-readable storage medium storing one or more programs for causing a computer to execute an image evaluating method comprising:
inputting an image;
determining if an exposure value corresponding to an input image is to be evaluated based on information obtained by the input image, and
evaluating the exposure value corresponding to the input image according to a determination result using an exposure evaluation model generated based on a plurality of training images which have different exposure values and exposure information corresponding to each of the training images.

\* \* \* \* \*